(12) United States Patent
Tchakerian

(10) Patent No.: US 10,210,450 B2
(45) Date of Patent: Feb. 19, 2019

(54) SYSTEMS AND METHODS FOR A MULTI-TENANT WIRELESS CHARGING PLATFORM

(71) Applicant: Shant Tchakerian, Glendale, CA (US)

(72) Inventor: Shant Tchakerian, Glendale, CA (US)

( * ) Notice: Subject to any disclaimer, the term of this patent is extended or adjusted under 35 U.S.C. 154(b) by 0 days.

(21) Appl. No.: 15/828,312

(22) Filed: Nov. 30, 2017

(65) Prior Publication Data

US 2018/0157956 A1    Jun. 7, 2018

Related U.S. Application Data

(60) Provisional application No. 62/429,724, filed on Dec. 2, 2016.

(51) Int. Cl.

| | |
|---|---|
| G08B 23/00 | (2006.01) |
| G06K 19/14 | (2006.01) |
| H02J 50/40 | (2016.01) |
| H04W 12/06 | (2009.01) |
| H02J 50/10 | (2016.01) |
| H02J 7/00 | (2006.01) |
| H02J 7/02 | (2016.01) |
| H02J 50/80 | (2016.01) |

(52) U.S. Cl.
CPC .......... *G06K 19/145* (2013.01); *H02J 7/0004* (2013.01); *H02J 7/025* (2013.01); *H02J 50/10* (2016.02); *H02J 50/40* (2016.02); *H02J 50/80* (2016.02); *H04W 12/06* (2013.01)

(58) Field of Classification Search
None
See application file for complete search history.

(56) References Cited

U.S. PATENT DOCUMENTS

| | | | | |
|---|---|---|---|---|
| 2014/0162554 A1* | 6/2014 | Sankar | ................. | H04B 5/0031 455/41.2 |
| 2014/0239733 A1* | 8/2014 | Mach | ..................... | H02J 5/005 307/104 |
| 2017/0301220 A1* | 10/2017 | Jarrell | .................... | H04W 4/70 |

* cited by examiner

*Primary Examiner* — Adolf Dsouza
(74) *Attorney, Agent, or Firm* — Shant Tchakerian

(57) ABSTRACT

A charging system stores first RFID tag information of a platform account of a platform system at an account system of the charging system. responsive to reception of the first RFID tag information from a first RFID tag, an RFID reader provides the first RFID tag information to a power controller of the charging system. Responsive to reception of the first RFID tag information, a power controller of the charging system determines whether the first RFID tag information is authorized for the charging system by using the account system. Responsive to a determination that the first RFID tag information is authorized, the power controller controls a charging transmitter of the charging system to generate an electromagnetic field that is receivable by a charging receiver. The power controller meters power usage of the charging receiver for the first RFID tag information.

14 Claims, 5 Drawing Sheets

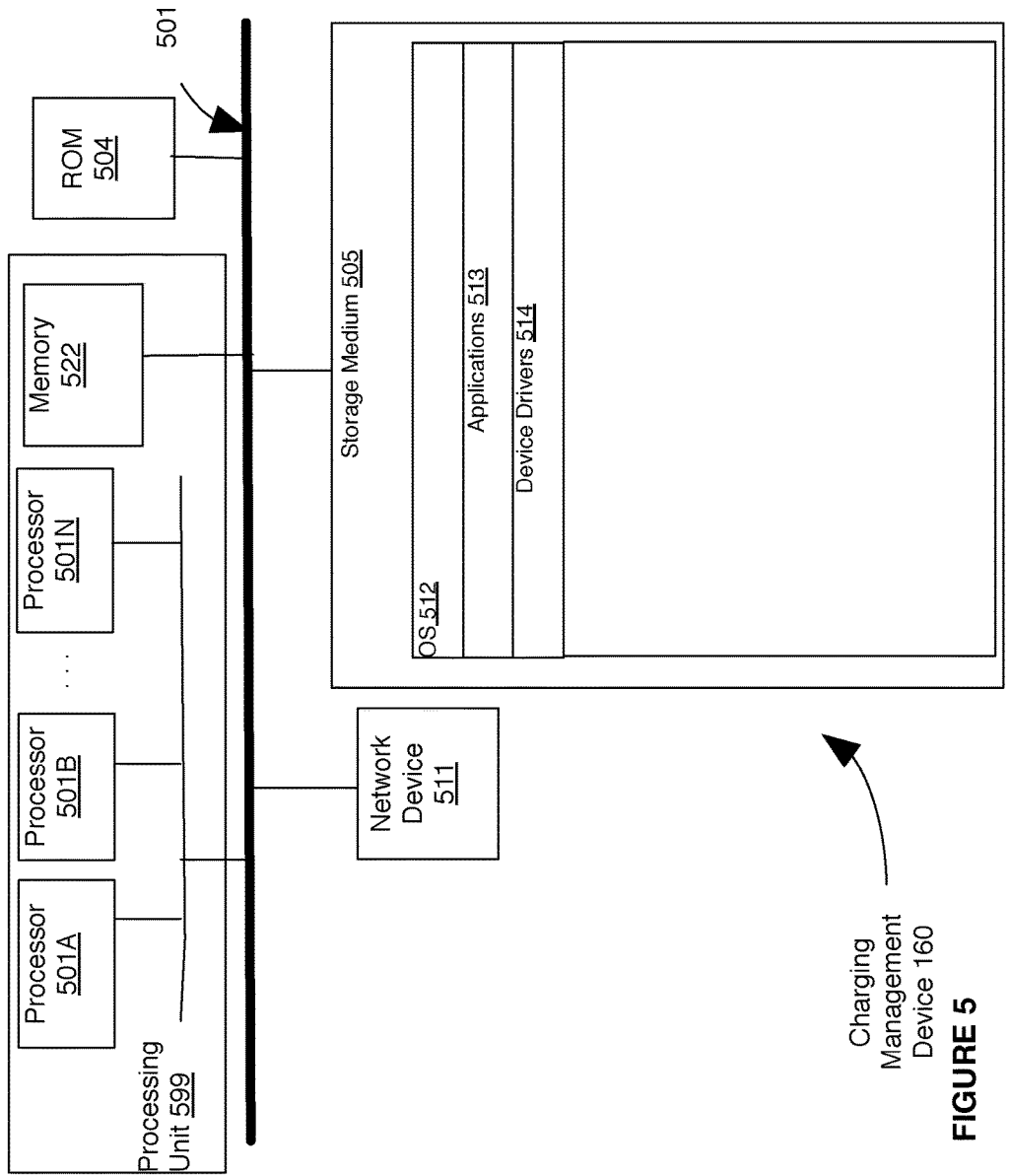

SYSTEMS AND METHODS FOR A MULTI-TENANT WIRELESS CHARGING PLATFORM

CROSS-REFERENCE TO RELATED APPLICATIONS

This application claims the benefit of U.S. Provisional Application Ser. No. 62/429,724, filed on 2 Dec. 2016, which is incorporated in its entirety by this reference.

TECHNICAL FIELD

This disclosure relates generally to the wireless charging field, and more specifically to a new and useful system and method for providing access to a wireless charging station.

BACKGROUND

Conventional inductive charging techniques (also known as wireless charging) typically involve use of an electromagnetic field to transfer energy between two objects through electromagnetic induction. Induction chargers use an induction coil to create an alternating electromagnetic field from within a charging base, and a second induction coil in a portable device takes power from the electromagnetic field and converts it back into electric current to charge a battery.

BRIEF DESCRIPTION OF THE FIGURES

FIG. 5 is a diagram depicting system architecture of a charging management device, according to embodiments.

DESCRIPTION OF THE PREFERRED EMBODIMENTS

Figure 1:
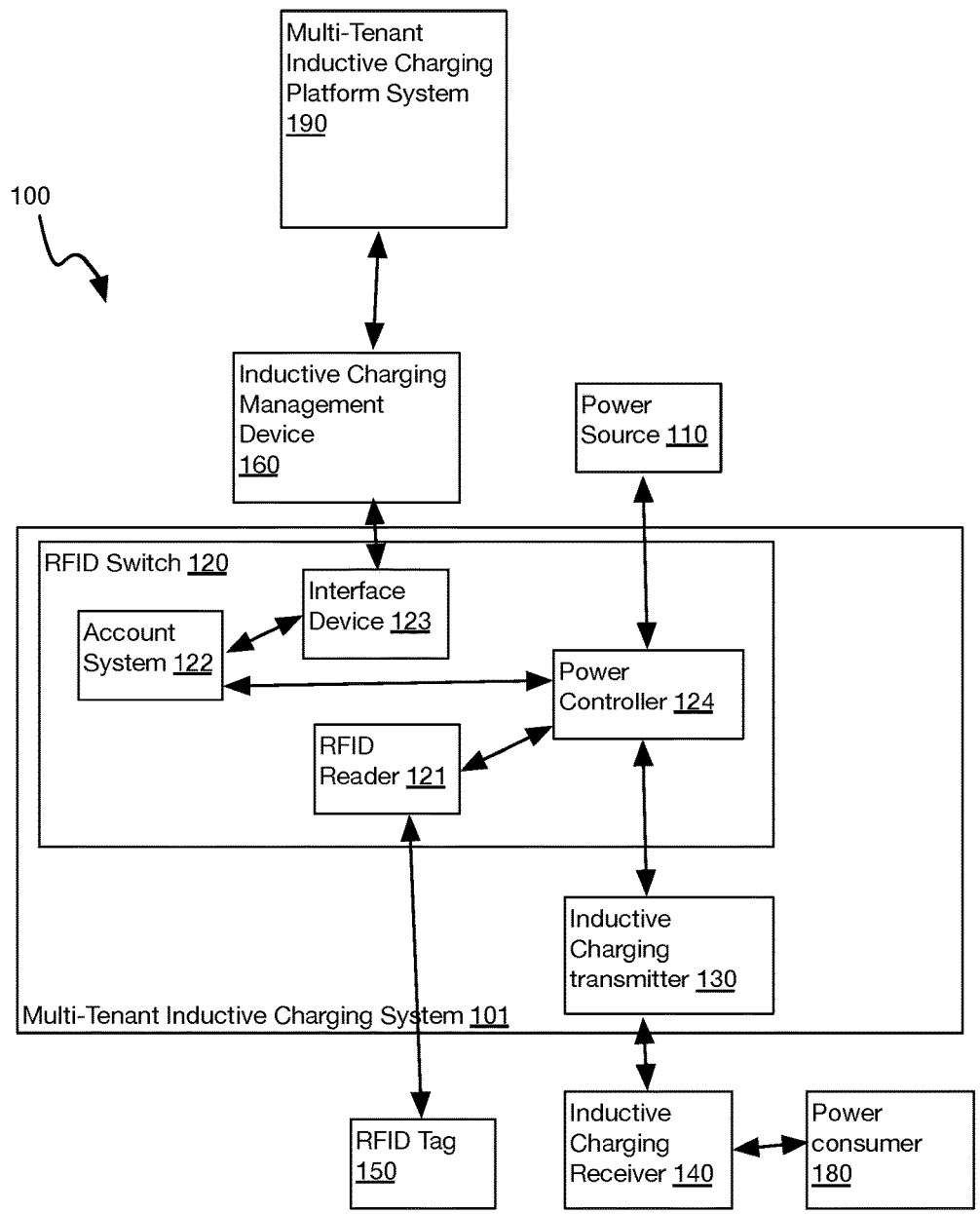
FIG. 1 is a schematic representation of a system, according to embodiments.

The following description of the embodiments is not intended to limit the disclosure to these embodiments, but rather to enable any person skilled in the art to make and use this disclosure.

Some embodiments of the systems and methods described herein enable an entity to manage a public charging station (e.g., 101) that is accessible by authorized users. Authorized users gain access to the charging station by registering an account at a charging platform system (e.g., 190), associating the registered account with RFID (radio frequency identification) tag information of their RFID tag, and providing billing information. When the RFID tag is detected by an RFID reader of the charging station, the charging station is activated, thereby providing power to a charging receiver (e.g., 140) placed near the charging transmitter (e.g., 130) of the charging station. Use of the charging station is metered and logged for the RFID tag being used, and the metering information is used to bill the user of the RFID tag being used at the charging station. According to aspects, a user of the charging station registers a charging station account at the charging platform system, and the charging station user's account is credited for use of the charging station by registered users (power consumers) of the platform system 190.

Some embodiments of the systems and methods described herein enable an entity to manage a public charging station (e.g., 101) that is accessible by authorized users. Authorized users gain access to the charging station by registering an account at a charging platform system (e.g., 190), associating the registered account with RFID tag information of their RFID tag. When the RFID tag is detected by an RFID reader of the charging station, the charging station is activated, thereby providing power to a charging receiver (e.g., 140) placed near the charging transmitter (e.g., 130) of the charging station. Use of the charging station is metered and logged for the RFID tag being used. According to aspects, a user of the charging station registers a charging station account at the charging platform system, and the charging station user's account is credited for use of the charging station by registered users (power consumers) of the platform system 190. In some embodiments, the platform system 190 provides metering information to an advertiser system and the advertiser system provides the funds that are credited to the charging station's user account.

In some embodiments, the charging station 101 is included in a car to transform the car into a mobile, public wireless charging station that uses the car's battery. In other words, while the car isn't being used, the car's battery can be used to power a public wireless charging station, and the owner of the car can generate revenue. In some embodiments, the power controller 124 includes control logic to prevent the car's battery from being depleted below a threshold amount required to start the car. In some embodiments, the car's owner can use an Internet-enabled mobile device (e.g., a mobile phone) to update the account system 122 of the charging station 101 when the mobile device is communicatively coupled to the charging station 101. In some embodiments, the car's owner can use an Internet-enabled mobile device (e.g., a mobile phone) to provide metered usage for an account to the platform system 190 when the mobile device is communicatively coupled to the charging station 101. In some embodiments, the car's owner can use the inductive charging management device 160 to update the account system 122 of the charging station 101 when the inductive charging management device 160 is communicatively coupled to the charging station 101. In some embodiments, the car's owner can use the inductive charging management device 160 to provide metered usage for an account to the platform system 190 when the inductive charging management device 160 is communicatively coupled to the charging station 101.

In some embodiments, the charging station 101 provides emergency power in situations in which a user of the charging station does not have other access to power sources. In some embodiments, the RFID tag is passive, thereby enabling use of the charging station in emergency situations. In other words, in contrast to an active RFID tag that might run out of power, a passive RFID tag is not reliant on power, and thus use of the charging system is not dependent of the user of the charging system having a powered RFID tag.

Systems

FIG. 1 is a schematic representation of a system of embodiments. The system 100 includes a multi-tenant inductive charging system 101, a multi-tenant inductive charging platform system 190, a management device 160, a power source 110, an inductive charging receiver 140, and an RFID tag 150.

In some embodiments, the RFID tag is embedded in a case of mobile device. In some embodiments, the RFID tag is embedded in a case of the power consumer 180.

In some embodiments, the platform system 190 is a cloud system. In some embodiments, the platform system 190 includes at least one hardware server that includes at least one processing unit and at least one storage device. In some embodiments, the platform system 190 provides at least one of a registration application program interface (API) (e.g., a REST API) and a user interface (e.g., a web user interface) for registering charging system accounts for both charging station operators and users who wish to use a charging system.

In some embodiments, the RFID tag 150 is a passive RFID tag. In some embodiments, the RFID tag 150 is an active RFID tag.

In some embodiments, the power source 110 is an AC power source. In some embodiments the power source 110 is a DC power source. In some embodiments, the power source 110 is a car battery. In some embodiments, the power source 110 is a car battery of a car (not shown), the multi-tenant inductive charging system 101 is arranged within the car, and the inductive charging transmitter 130 is positioned within the car, the inductive charging receiver 140 is positioned external to the car, and the inductive charging transmitter 130 is electrically coupled to the inductive charging receiver 140. In some embodiments, the power consumer 180 is positioned external to the car. In some embodiments, the RFID tag 150 is positioned external to the car. In some embodiments, the platform system 190 is positioned external to the car. In some embodiments, the management device 160 is positioned external to the car. In some embodiments, the management device 160 is positioned internal to the car.

In some embodiments, the inductive charging receiver 140 is included within a mobile electronic device (e.g., a phone, watch, computer, and the like). In some embodiments, the inductive charging receiver 140 is included within a lighting system. In some embodiments, the inductive charging receiver 140 is included within an electrically powered emergency safety device.

In some embodiments, the multi-tenant inductive charging system 101 includes an RFID switch 120 and an inductive charging transmitter 130.

In some embodiments, the charging transmitter 130 includes an induction coil that is constructed to create an alternating electromagnetic field that is receivable by the charging receiver 140.

In some embodiments, the charging receiver 140 includes an induction coil that is constructed to take power from the electromagnetic field generated by the charging transmitter 130, and convert the electromagnetic field into electric current. In some embodiments, the charging receiver 140 converts the electromagnetic field into electric current and provides the electric current to a power consumer (e.g., the power consumer 180). In some embodiments, the power consumer 180 is one of an electronic device and a battery.

In some embodiments, the RFID switch 120 includes an RFID reader 121, an account system 122, an interface device 123, and a power controller 124.

In some embodiments, the management device 160 includes a first network interface that is constructed to communicatively couple to the platform system 190. In some embodiments, the management device 160 includes a first network interface that is constructed to communicatively couple to the platform system 190 via the Internet. In some embodiments, the management device 160 includes a second network interface that is constructed to communicatively couple to the interface device 123. In some embodiments, the management device 160 includes a second network interface that is constructed to communicatively couple to the interface device 123 via one of a wired or wireless interface (e.g., USB, Bluetooth, Wifi, NFC, and the like).

In some embodiments, the management device 160 is a computing device that includes at least one processing unit and at least one storage device, and the management device 160 is constructed to store and execute machine-executable instructions of an inductive charging management application that is constructed to manage wireless charging at the charging system 101 by communicating with the charging system 101 and the platform system 190. In some embodiments, the management device 160 is a mobile device (e.g., phone, laptop, computer, tablet, smart watch, and the like).

In some embodiments, the power source 110 is electrically coupled to the power controller 124. In some embodiments, the power controller 124 is electrically coupled to the charging transmitter 130. In some embodiments, the charging transmitter 130 is electrically coupled to the charging receiver 140. In some embodiments, the charging transmitter 130 is inductively coupled to the charging receiver 140. In some embodiments, the charging receiver 140 is electrically coupled to the power consumer 180.

In some embodiments, the RFID tag 150 is communicatively coupled to the RFID reader 121. In some embodiments, the RFID tag 150 is electrically coupled to the RFID reader 121. In some embodiments, the RFID tag 150 is inductively coupled to the RFID reader 121.

In some embodiments, the interface device 123 is communicatively coupled to the account system 122. In some embodiments, the interface device 123 is electrically coupled to the account system 122.

In some embodiments, the account system 122 is communicatively coupled to the power controller 124. In some embodiments, the account system 122 is electrically coupled to the power controller 124.

In some embodiments, the power controller 124 is communicatively coupled to the RFID reader 121. In some embodiments, the power controller 124 is communicatively coupled to the power source 110. In some embodiments, the power controller 124 is communicatively coupled to the charging transmitter 130. In some embodiments, the power controller 124 is electrically coupled to the RFID reader 121. In some embodiments, the power controller 124 is electrically coupled to the power source 110. In some embodiments, the power controller 124 is electrically coupled to the charging transmitter 130.

In some embodiments, the account system 122 includes a hardware storage device.

In some embodiments, the power controller 124 includes a metering system that is constructed to meter power usage of the charging receiver 140. In some embodiments, the metering system is constructed to store metered power usage at the account system 122 in association with one of an RFID tag information and an account identifier of the RFID tag 150. In some embodiments, the charging system 101 is constructed to provide metered power usage to the platform system 190 in association with one of an RFID tag information and an account identifier of the RFID tag 150.

In some embodiments, the charging system 101 is constructed to provide metered power usage to the platform system 190 in association with one of an RFID tag information and an account identifier of the RFID tag 150, and in association with an identifier of a first charging system account for the charging system 101.

—Non-RFID Systems

In some embodiments, the system 100 uses a mobile device (e.g., phone, tablet, smart watch, and the like) to provide authentication information to activate the charging transmitter 130, and the system does not include an RFID reader or RFID tag. In some embodiments, a non-RFID system 100 includes a multi-tenant inductive charging system 101, a multi-tenant inductive charging platform system 190, a management device 160, a power source 110, and an inductive charging receiver 140. In some embodiments, the charging system of a non-RFID system includes the power controller 124, the account system 122, and the interface device 123.

Methods

Figure 2:
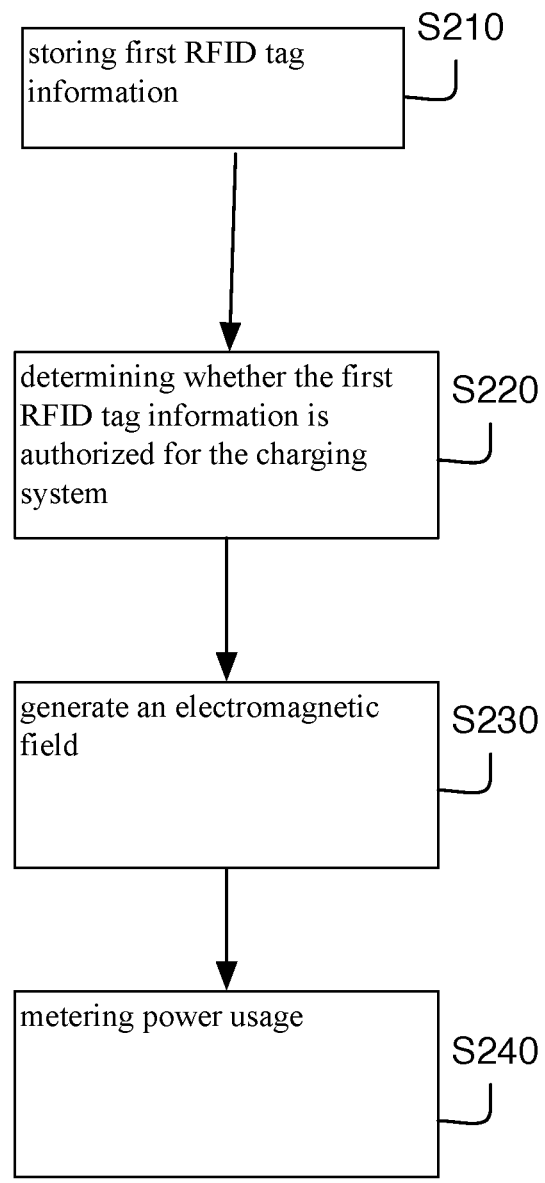
FIG. 2 is a representation of a method, according to embodiments.

FIG. 2 is a representation of a method of embodiments. The method 200 of FIG. 2 includes: the charging system 101 storing first RFID tag information (of a first platform account of the charging platform system 190) at the account system 122 (process S210); responsive to reception of the first RFID tag information from the first RFID tag 150, the RFID reader 121 providing the first RFID tag information to the power controller 124; responsive to reception of the first RFID tag information from the RFID reader 121, the power controller 124 determining whether the first RFID tag information is authorized for the charging system 101 by using the account system 122 (process S220); responsive to a determination that the first RFID tag information is authorized for the charging system 101, the power controller 124 controlling the charging transmitter 130 generate an electromagnetic field that is receivable by the charging receiver 140 (process S230); and the power controller 124 metering power usage of the charging receiver 140 for the first RFID tag information (process S240).

In some embodiments, metering power usage includes generating metering information that include at least one of a time of the power usage by the charging receiver 140, logging location information of the charging system 101 (e.g., as determined by, for example, a GPS unit of the charging system 101, a GPS unit of the management device 160, and the like), and information of the charging system (e.g., an identifier of the charging system 101). In some embodiments, the charging system 101 provides the metering information to the platform system 190, and the platform system 190 provides the metering information to an advertising system.

In some embodiments, the method 200 includes: responsive to a determination by the power controller 124 that the RFID reader 121 is not receiving the first RFID tag information from the RFID tag 150, the power controller 124 storing metered power usage at the account system 122 in association with one of an RFID tag information and an account identifier of the RFID tag 150.

In some embodiments, the method 200 includes: responsive to a determination by the power controller 124 that the RFID reader 121 is not receiving the first RFID tag information from the RFID tag 150, the power controller 124 providing metered power usage to the platform system 190 in association with one of an RFID tag information and an account identifier of the RFID tag 150.

In some embodiments, the method 200 includes: the platform system 190 generating billing information for the first platform account based on the metered usage of the first RFID tag information.

In some embodiments, the method 200 includes: debiting the first platform account based on the billing information.

In some embodiments, the method 200 includes: crediting a first charging system account of the charging system 101 based on the billing information.

In some embodiments, the power controller 124 controlling the charging transmitter 130 generate an alternating electromagnetic field includes: closing an electrical circuit between the power source 110 and the charging transmitter 130. In some embodiments, the power controller 124 closes the electrical circuit by using a mechanical switch (e.g., a relay). In some embodiments, the power controller 124 closes the electrical circuit by using an electrical switch (e.g., a transistor).

In some embodiments, the power controller 124 determining whether the first RFID tag information is authorized for the charging system 101 includes: determining whether the first RFID tag information is included in the account system 122. In some embodiments, the power controller 124 determining whether the first RFID tag information is authorized for the charging system 101 includes: determining whether the first RFID tag information is included in the account system 122 and includes information identifying the first RFID tag information as being authorized for the charging system 101.

In some embodiments, the method 200 includes: the platform system 190 receiving registration information for the first platform account, and storing the registration information at the platform system 190. In some embodiments, the registration information includes the first RFID tag information, and billing information for the first platform account.

In some embodiments, the process S210 includes: the charging system 101 receiving the first RFID tag information from the platform system 190 via the management device 160. In some embodiments, the management device 160 includes a client module that is constructed to receive (from the platform system 190) RFID tag information of RFID tags authorized for the charging system 101, and store the authorized RFID tag information at the account system 122 via the interface device 123.

In some embodiments, the method 200 includes: the platform system 190 receiving registration information for a first charging system account, and storing the registration information at the platform system 190. In some embodiments, the registration information for the first charging system account includes payment information for the first charging system account.

—Non-RFID Methods

In some embodiments of non-RFID methods, the method includes: the charging system 101 storing first authentication information (of a first platform account of the charging platform system 190) at the account system 122; responsive to reception of the first authentication information (e.g., via the interface device 123), the power controller 124 determining whether the first authentication information is associated with a platform account authorized for the charging system o01 by using the account system 122; responsive to a determination that the first authentication information is associated with a platform account authorized for the charging system 101, the power controller 124 controlling the charging transmitter 130 generate an electromagnetic field that is receivable by the charging receiver 140; the power controller 124 metering power usage of the charging receiver 140 for first platform account. In some embodiments, the power controller 124 receives the first authentication information from a mobile device (e.g., smart watch, phone, pda, tablet, computer, and the like) via the interface device 123, and the mobile device is a device of a user of the power consuming device 180. In some embodiments, the power controller 124 receives the first authentication information from the power consumer device 180 via the interface device 123.

FIG. 3

Figure 3:
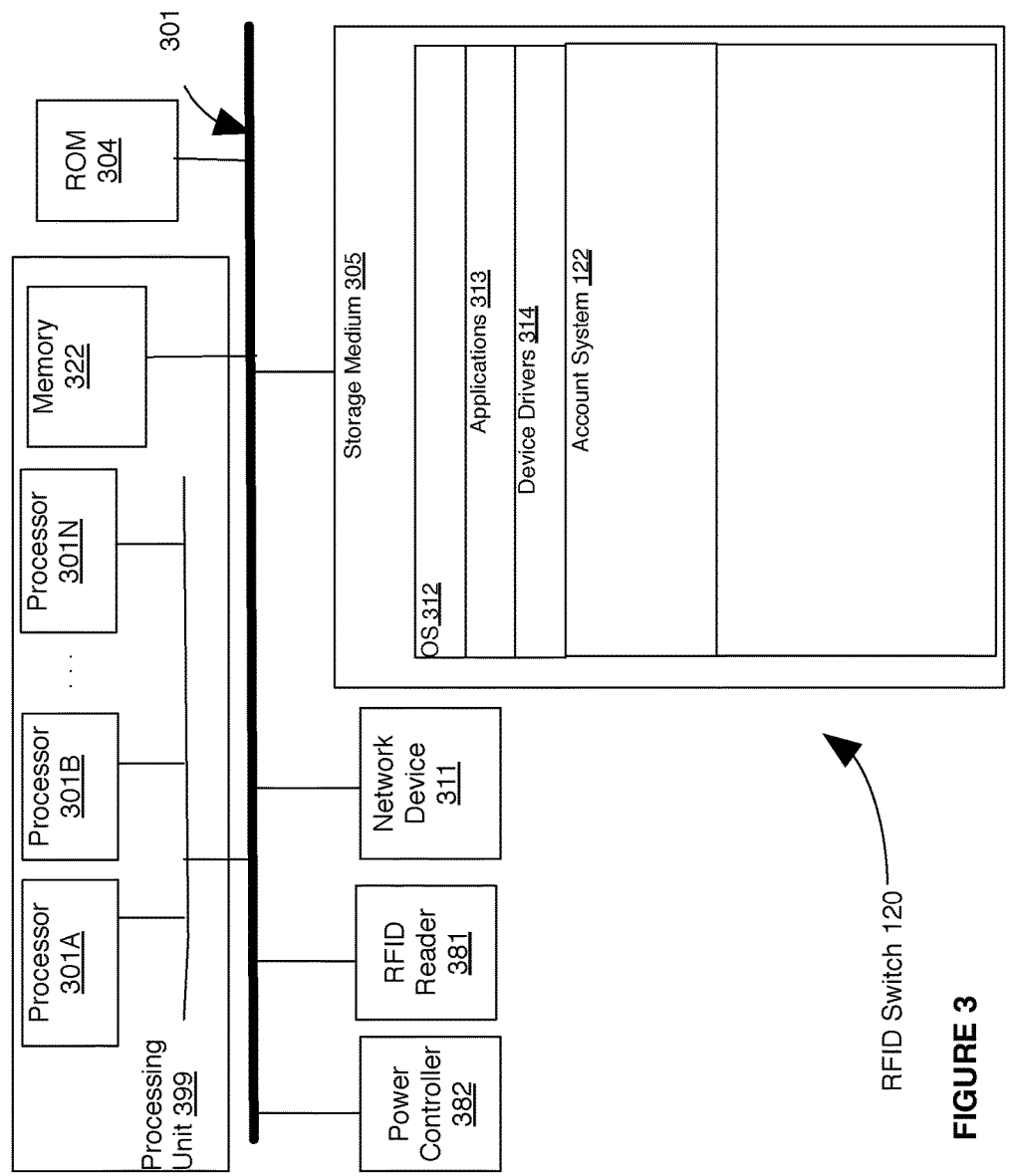
FIG. 3 is a diagram depicting system architecture of an RFID switch, according to embodiments.

FIG. 3 is a diagram depicting system architecture of an RFID switch, according to embodiments. In some embodiments, the RFID switch is implemented as a single hardware device (e.g., 120). In some embodiments, the RFID switch is implemented as a plurality of hardware devices similar to the hardware device 120 of FIG. 3.

In some embodiments, the RFID switch includes a bus 301 that interfaces with the processors 301A-301N, the main memory (e.g., a random access memory (RAM)) 322, a read only memory (ROM) 304, a processor-readable storage medium 305, a network device 311, and an RFID reader 381. In some embodiments, the RFID switch includes at least one of a display device and a user input device. In some embodiments, the RFID switch includes one processor (e.g., 301A). In some embodiments, the RFID switch includes a power controller 382. In some embodiments, the RFID reader 381 is similar to the RFID reader 121 of FIG. 1. In some embodiments, the power controller 382 is similar to the power controller 124 of FIG. 1.

The processors 301A-301N may take many forms, such as one or more of a microcontroller, a CPU (Central Processing Unit), a GPU (Graphics Processing Unit), and the like. In some embodiments, RFID switch includes at least one of a central processing unit (processor), a GPU, and a multi-processor unit (MPU).

The processors 301A-301N and the main memory 322 form a processing unit 399. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

The network adapter device 311 provides one or more wired or wireless interfaces for exchanging data and commands between the RFID switch (e.g., 120) and other devices, such as a charging management device (e.g., 160). Such wired and wireless interfaces include, for example, a universal serial bus (USB) interface, Bluetooth interface, Wi-Fi interface, Ethernet interface, InfiniBand interface, Fibre Channel interface, near field communication (NFC) interface, and the like.

In some embodiments, network adapter device is similar to the interface device 123 of FIG. 1.

Machine-executable instructions in software programs (such as an operating system, application programs, and device drivers) are loaded into the memory 322 (of the processing unit 399) from the processor-readable storage medium 305, the ROM 304 or any other storage location. During execution of these software programs, the respective machine-executable instructions are accessed by at least one of processors 301A-301N (of the processing unit 399) via the bus 301, and then executed by at least one of processors 301A-301N. Data used by the software programs are also stored in the memory 322, and such data is accessed by at least one of processors 301A-301N during execution of the machine-executable instructions of the software programs. The processor-readable storage medium 305 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

The processor-readable storage medium 305 includes machine-executable instructions (and related data) for an operating system 312, software programs 313, and device drivers 314. In some embodiments, the storage medium includes machine-executable program instructions for controlling the charging platform system to perform at least one of the processes of FIG. 2. In some embodiments, the storage medium includes machine-executable program instructions for the account system 122.

FIG. 4

Figure 4:
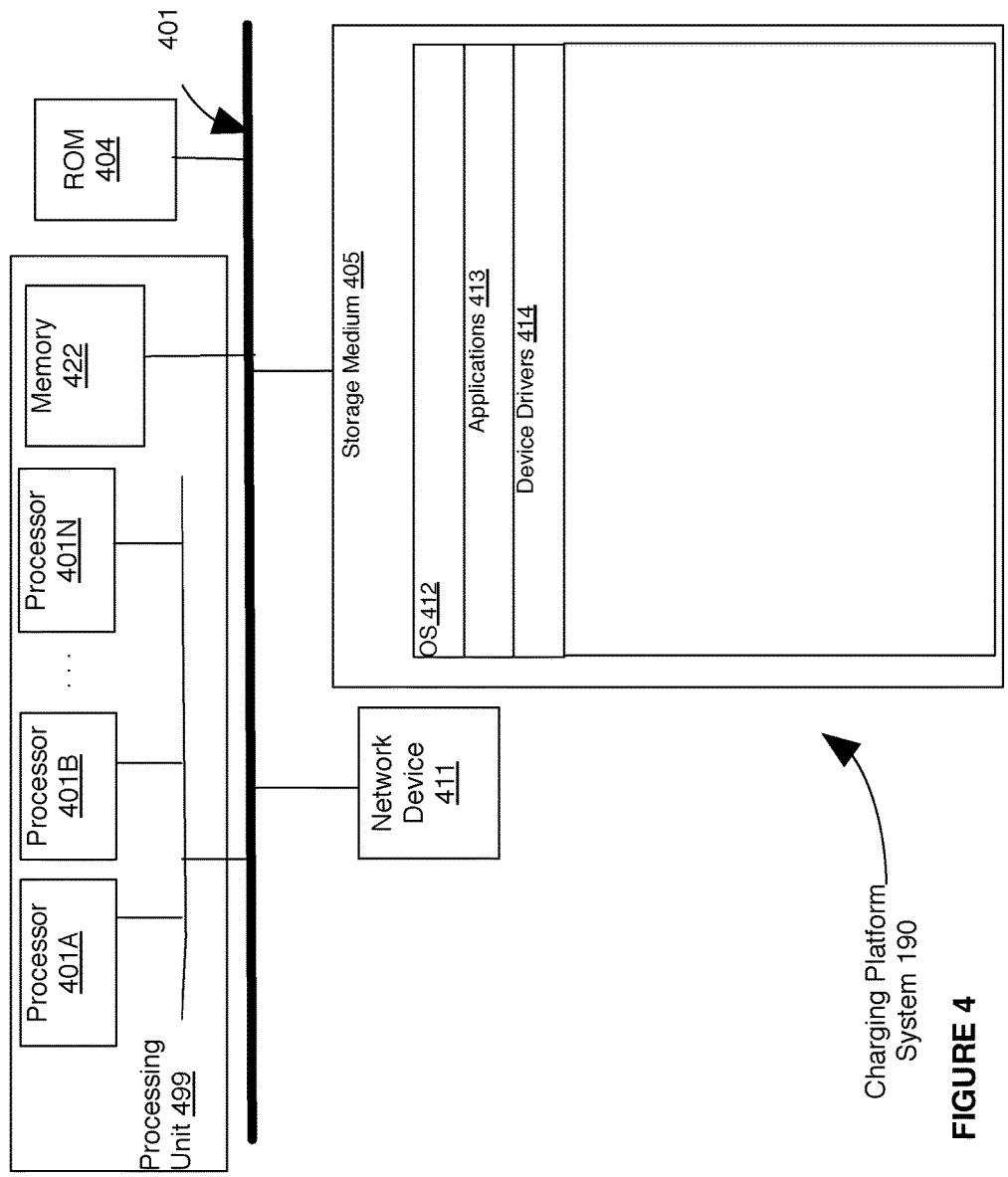
FIG. 4 is a diagram depicting system architecture of a charging platform system, according to embodiments.

FIG. 4 is a diagram depicting system architecture of a charging platform system, according to embodiments. In some embodiments, the charging platform system is implemented as a single hardware server device (e.g., 190). In some embodiments, the charging platform system is implemented as a plurality of hardware devices similar to the hardware server device 190 of FIG. 4.

In some embodiments, the charging platform system includes a bus 401 that interfaces with the processors 401A-401N, the main memory (e.g., a random access memory (RAM)) 422, a read only memory (ROM) 404, a processor-readable storage medium 405, and a network device 411. In some embodiments, the charging platform system includes at least one of a display device and a user input device. In some embodiments, the charging platform system includes one processor (e.g., 401A).

The processors 401A-401N may take many forms, such as one or more of a microcontroller, a CPU (Central Processing Unit), a GPU (Graphics Processing Unit), and the like. In some embodiments, charging platform system includes at least one of a central processing unit (processor), a GPU, and a multi-processor unit (MPU).

The processors 401A-401N and the main memory 422 form a processing unit 499. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

The network adapter device 411 provides one or more wired or wireless interfaces for exchanging data and commands between the charging platform system (e.g., 190) and other devices, such as a charging management device (e.g., 160). Such wired and wireless interfaces include, for example, a universal serial bus (USB) interface, Bluetooth interface, Wi-Fi interface, Ethernet interface, InfiniBand interface, Fibre Channel interface, near field communication (NFC) interface, and the like.

Machine-executable instructions in software programs (such as an operating system, application programs, and device drivers) are loaded into the memory 422 (of the processing unit 499) from the processor-readable storage medium 405, the ROM 404 or any other storage location. During execution of these software programs, the respective machine-executable instructions are accessed by at least one of processors 401A-401N (of the processing unit 499) via the bus 401, and then executed by at least one of processors 401A-401N. Data used by the software programs are also stored in the memory 422, and such data is accessed by at least one of processors 401A-401N during execution of the machine-executable instructions of the software programs. The processor-readable storage medium 405 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

The processor-readable storage medium 405 includes machine-executable instructions (and related data) for an operating system 412, software programs 413, and device drivers 414. In some embodiments, the storage medium includes machine-executable program instructions for controlling the charging platform system to perform at least one of the processes of FIG. 2.

FIG. 5

FIG. 5 is a diagram depicting system architecture of a charging management device, according to embodiments. In some embodiments, the charging management device is implemented as a single hardware server device (e.g., 160). In some embodiments, the charging management device is implemented as a plurality of hardware devices similar to the hardware device 160 of FIG. 5. In some embodiments, the charging management device is a mobile device.

In some embodiments, the charging management device includes a bus 501 that interfaces with the processors 501A-501N, the main memory (e.g., a random access memory (RAM)) 522, a read only memory (ROM) 504, a processor-readable storage medium 505, and a network device 511. In some embodiments, the charging management device includes at least one of a display device and a user input device. In some embodiments, the charging management device includes one processor (e.g., 501A).

The processors 501A-501N may take many forms, such as one or more of a microcontroller, a CPU (Central Processing Unit), a GPU (Graphics Processing Unit), and the like. In some embodiments, charging management device includes at least one of a central processing unit (processor), a GPU, and a multi-processor unit (MPU).

The processors 501A-501N and the main memory 522 form a processing unit 599. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

The network adapter device 511 provides one or more wired or wireless interfaces for exchanging data and commands between the charging management device (e.g., 160) and other devices, such as a charging platform system (e.g., 190). Such wired and wireless interfaces include, for example, a universal serial bus (USB) interface, Bluetooth interface, Wi-Fi interface, Ethernet interface, InfiniBand interface, Fibre Channel interface, near field communication (NFC) interface, and the like.

Machine-executable instructions in software programs (such as an operating system, application programs, and device drivers) are loaded into the memory 522 (of the processing unit 599) from the processor-readable storage medium 505, the ROM 504 or any other storage location. During execution of these software programs, the respective machine-executable instructions are accessed by at least one of processors 501A-501N (of the processing unit 599) via the bus 501, and then executed by at least one of processors 501A-501N. Data used by the software programs are also stored in the memory 522, and such data is accessed by at least one of processors 501A-501N during execution of the machine-executable instructions of the software programs. The processor-readable storage medium 505 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

The processor-readable storage medium 505 includes machine-executable instructions (and related data) for an operating system 512, software programs 513, and device drivers 514. In some embodiments, the storage medium includes machine-executable program instructions for controlling the charging management device to perform at least one of the processes of FIG. 2.

Machines

The systems and methods of some embodiments and variations thereof can be embodied and/or implemented at least in part as a machine configured to receive a computer-readable medium storing computer-readable instructions. The instructions are preferably executed by computer-executable components. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

CONCLUSION

As a person skilled in the art will recognize from the previous detailed description and from the figures and claims, modifications and changes can be made to the embodiments disclosed herein without departing from the scope defined in the claims.

What is claimed is:

1. A method comprising:
a charging system storing first RFID (radio frequency identification) tag information of a first platform account of a platform system at an account system of the charging system, the charging system being external to the platform system;
responsive to reception of the first RFID tag information from a first RFID tag external to the charging system and the platform system, an RFID reader of the charging system providing the first RFID tag information to a power controller of the charging system;
responsive to reception of the first RFID tag information from the RFID reader, the power controller of the charging system determining whether the first RFID tag information is authorized for the charging system by using the account system;
responsive to a determination that the first RFID tag information is authorized for the charging system, the power controller controlling a charging transmitter of the charging system to generate an electromagnetic field that is receivable by a charging receiver external to the charging system; and
the power controller metering power usage of the charging receiver for the first RFID tag information, wherein the charging system receives the first RFID tag information from the platform system via a management device, and wherein the management device includes a client module that is constructed to: receive from the platform system RFID tag information of RFID tags authorized for the charging system, and store the authorized RFID tag information at the account system via a interface device of the charging system.

2. The method of claim 1, wherein metering power usage includes generating metering information that includes at least one of: a time of the power usage by the charging receiver, location information of the charging system, and information of the charging system.

3. The method of claim 2, wherein the charging system provides the metering information to the platform system, and the platform system provides the metering information to an advertising system that is external to the platform system and the charging system.

4. The method of claim 1, further comprising: responsive to a determination by the power controller that the RFID reader is not receiving the first RFID tag information from the first RFID tag, the power controller storing metered power usage at the account system in association with one of the first RFID tag information and an account identifier of the RFID tag.

5. The method of claim 1, further comprising: responsive to a determination by the power controller that the RFID reader is not receiving the first RFID tag information from the first RFID tag, the power controller providing metered power usage to the platform system in association with one of the RFID tag information and an account identifier of the first RFID tag.

6. The method of claim 1, further comprising: the platform system generating billing information for the first platform account based on the metered usage of the first RFID tag information.

7. The method of claim 6, further comprising: the platform system debiting the first platform account based on the billing information.

8. The method of claim 7, further comprising: the platform system crediting a first charging system account of the charging system based on the billing information.

9. The method of claim 1, wherein the electromagnetic field is an alternating electromagnetic field, and wherein the power controller controlling a charging transmitter of the charging system to generate an electromagnetic field comprises: the power controller closing an electrical circuit between a power source and the charging transmitter.

10. The method of claim 9, wherein the power controller closes the electrical circuit by using one of a mechanical switch and an electrical switch.

11. The method of claim 1, wherein the power controller determining whether the first RFID tag information is authorized for the charging system comprises: determining whether the first RFID tag information is included in the account system.

12. The method of claim 1, wherein the power controller determining whether the first RFID tag information is authorized for the charging system comprises: determining whether the first RFID tag information is included in the account system; and determining whether the first RFID tag information includes information identifying the first RFID tag information as being authorized for the charging system.

13. The method of claim 1, further comprising, the platform system receiving registration information for the first platform account, and storing the registration information at the platform system.

14. The method of claim 1, further comprising: the platform system receiving registration information for a first charging system account, and storing the registration information at the platform system.

* * * * *